(12) United States Patent
Noh (10) Patent No.: US 9,660,230 B2
(45) Date of Patent: May 23, 2017

(54) BATTERY PACK HAVING END PLATES (71) Applicant: SAMSUNG SDI CO., LTD., Yongin-si, Gyeonggi-do (KR)

(72) Inventor: Kyoung-Hwan Noh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 456 days.

(21) Appl. No.: 14/184,479

(22) Filed: Feb. 19, 2014

(65) Prior Publication Data

US 2015/0024253 A1    Jan. 22, 2015

(30) Foreign Application Priority Data

Jul. 18, 2013    (KR) .......................... 10-2013-0084923

(51) Int. Cl.
*H01M 6/42*    (2006.01)
*H01M 2/10*    (2006.01)

(52) U.S. Cl.
CPC ....... *H01M 2/1016* (2013.01); *H01M 2/1061* (2013.01); *H01M 2/1077* (2013.01)

(58) Field of Classification Search
CPC . H01M 2/1016; H01M 2/1022; H01M 2/1077
USPC ....................................................... 429/156
See application file for complete search history.

(56) References Cited

U.S. PATENT DOCUMENTS 5,766,801 A    6/1998  Inoue et al.
2008/0280194 A1    11/2008  Okada
2011/0117409 A1    5/2011  Lee et al.
2011/0159348 A1*    6/2011  Park .................... H01M 2/1077
                                                           429/151
2013/0183571 A1    7/2013  Miyazaki et al.
(Continued)

FOREIGN PATENT DOCUMENTS

JP    6-29041    2/1994
JP    09-120808    5/1997
JP    2006-185815 A    7/2006
(Continued)

OTHER PUBLICATIONS

English Machine Translation of Japanese Publication No. JP 2006-185815 A.
(Continued)

*Primary Examiner* — Gary Harris
(74) *Attorney, Agent, or Firm* — Lewis Roca Rothgerber Christie LLP (57) ABSTRACT Provided is a battery pack including a pair of end plates facing each other, a plurality of battery cells arrayed between the end plates, and a pair of side plates each extending along a length of the plurality of battery cells, and coupled to the end plates, wherein each of the end plates includes a base plate, bending portions bent from each edge of the base plate in a direction away from the plurality of battery cells, each bending portion having a reinforcing bead unit, and a flange portion connected to the base plate at each bending portion. According to one or more embodiments of the present invention, deformation of the battery pack may be efficiently suppressed and deterioration of a function of a battery cell may be prevented by blocking volume expansion due to recharging and discharging operations of the battery cell.

17 Claims, 9 Drawing Sheets

(56) References Cited

U.S. PATENT DOCUMENTS

2013/0288094 A1* 10/2013 Noh .................... H01M 2/1077
429/99

FOREIGN PATENT DOCUMENTS

| JP | 2008-282582 A | 11/2008 |
|----|---------------|---------|
| JP | 2010-205509 A | 9/2010 |
| KR | 10-2011-0053713 | 5/2011 |
| WO | WO 2012/043594 A1 | 4/2012 |

OTHER PUBLICATIONS

English Machine Translation of Japanese Publication No. JP 2010-205509 A.
KIPO Office Action dated Aug. 16, 2016, for corresponding Korean Patent Application No. 10-2013-0084923 (10 pages).
KIPO Office Action dated Feb. 25, 2017, for corresponding Korean Patent Application No. 10-2013-0084923 (8 pages).

* cited by examiner

BATTERY PACK HAVING END PLATES

CROSS-REFERENCE TO RELATED APPLICATION

This application claims priority to and the benefit of Korean Patent Application No. 10-2013-0084923, filed on Jul. 18, 2013, in the Korean Intellectual Property Office, the disclosure of which is incorporated herein in its entirety by reference.

BACKGROUND

1. Field

One or more embodiments of the present invention relate to a battery pack.

2. Description of the Related Art

In general, unlike a primary battery that cannot be charged, a secondary battery can be discharged and recharged. A secondary battery may be used as an energy source for mobile devices, electric vehicles, hybrid vehicles, electric bicycles, uninterruptible power supplies (UPSs), etc. According to the type of external device using the secondary battery, the secondary battery may be used in the form of a single battery or in the form of a battery module containing a plurality of secondary batteries grouped together.

A small mobile device such as a mobile phone may operate using only the output and capacity of a single battery during a predetermined time period, but an electric vehicle, a hybrid vehicle, or the like, requiring a greater amount of power and driven over a longer time period, generally requires a battery pack to avoid output and capacity issues. An output voltage and/or an output current supplied by the battery pack may increase with the number of embedded battery cells.

SUMMARY

One or more embodiments of the present invention include a battery pack wherein deformation may be efficiently suppressed, and wherein deterioration of a function of a battery cell of the battery pack may be prevented by blocking volume expansion due to discharging and recharging operations of the battery cell.

One or more embodiments of the present invention include a battery pack having an assembly guide that facilitates an assembly process while a plurality of battery cells are assembled and then modularized.

Additional aspects of embodiments of the present invention will be set forth in part in the description which follows and, in part, will be apparent from the description, or may be learned by practice of the presented embodiments.

According to one or more embodiments of the present invention, a battery pack includes a pair of end plates facing each other; a plurality of battery cells arrayed between the end plates; and a pair of side plates each extending along a length of the plurality of battery cells, and coupled to the end plates, wherein each of the end plates includes a base plate; bending portions bent from each edge of the base plate in a direction away from the plurality of battery cells, each bending portion having a reinforcing bead unit; and a flange portion connected to the base plate at each bending portion.

The reinforcing bead unit may be imprinted.

The reinforcing bead unit may be engraved on a first surface of each bending portion, and may be embossed on other surfaces of each bending portion.

The reinforcing bead unit may be engraved when the reinforcing bead unit is on an inner surface of the bending portions facing the plurality of battery cells, and the reinforcing bead unit may be embossed when the reinforcing bead unit is on an outer surface of the bending portions facing away from the plurality of battery cells.

The flange portion may include a top flange portion at an upper end of the base plate; a bottom flange portion at a lower end of the base plate; and a first side flange portion and a second side flange portion at each respective side surface of the base plate.

The reinforcing bead unit may include a first reinforcing bead unit on the bending portion connected to the top flange portion; a second reinforcing bead unit on he bending portions connected to the bottom flange portion; and a third reinforcing bead unit and a fourth reinforcing bead unit on the bending portions connected to the first side flange portion and the second side flange portion, respectively.

The pair of side plates may be coupled to the end plates with an assembly guide configured to align the end plates with the pair of side plates.

The assembly guide may include an assembly pin on each of the end plates; and an assembly rail in each of the side plates, the assembly rail being configured to receive the assembly pin and to guide a sliding movement of the assembly pin.

The flange portion may include a first side flange portion and a second side flange portion, respectively, on each side surface of the base plate, and each of the first side flange portion and the second side flange portion may include an assembly pin.

Each of the first side flange portion and the second side flange portion may be coupled to respective end portions of the side plates.

The first side flange portion and the second side flange portion may include coupling holes, and the side plates may include corresponding coupling holes such that when the first and second side flange portions are coupled to respective side plates, they overlap with the end portions of the side plates, and the coupling holes align at coupling positions, the coupling holes being configured to receive the coupling members inserted into the coupling holes.

The assembly pins of the first side flange portion and the second side flange portion may be configured to be inserted from an exterior of the respective side plates into the assembly rails, and may be configured to then slide to the coupling positions along the assembly rails.

The assembly rail may include an opening extending lengthwise along a sliding movement direction of the assembly pin.

The assembly rail may extend lengthwise along an array of the plurality of battery cells.

The opening of the assembly rail may be coupled to an exterior of each side plate.

The assembly rail may be located at both end portions of each of the side plates.

One assembly rail may be located at each of the end portions of each of the side plates.

Each end portion of each of the side plates may be coupled to a respective end plate.

According to one or more embodiments of the present invention, a battery pack includes a pair of end plates facing each other; a plurality of battery cells arrayed between the end plates; and a pair of side plates each extending along a length of the plurality of battery cells, and coupled to the end plates, wherein the pair of side plates may be coupled to the end plates with an assembly guide configured to align the end plates with the pair of side plates.

The assembly guide may include an assembly pin on each of the end plates; and an assembly rail in each of the side plates, the assembly rail being configured to receive the assembly pin and to guide a sliding movement of the assembly pin.

BRIEF DESCRIPTION OF THE DRAWINGS

These and/or other aspects of embodiments of the present invention will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. Accordingly, the present embodiments may have different forms and should not be construed as being limited to the descriptions set forth herein. Accordingly, the embodiments are merely described below, by referring to the figures, to explain aspects of the embodiments of the present invention.

Figure 1:
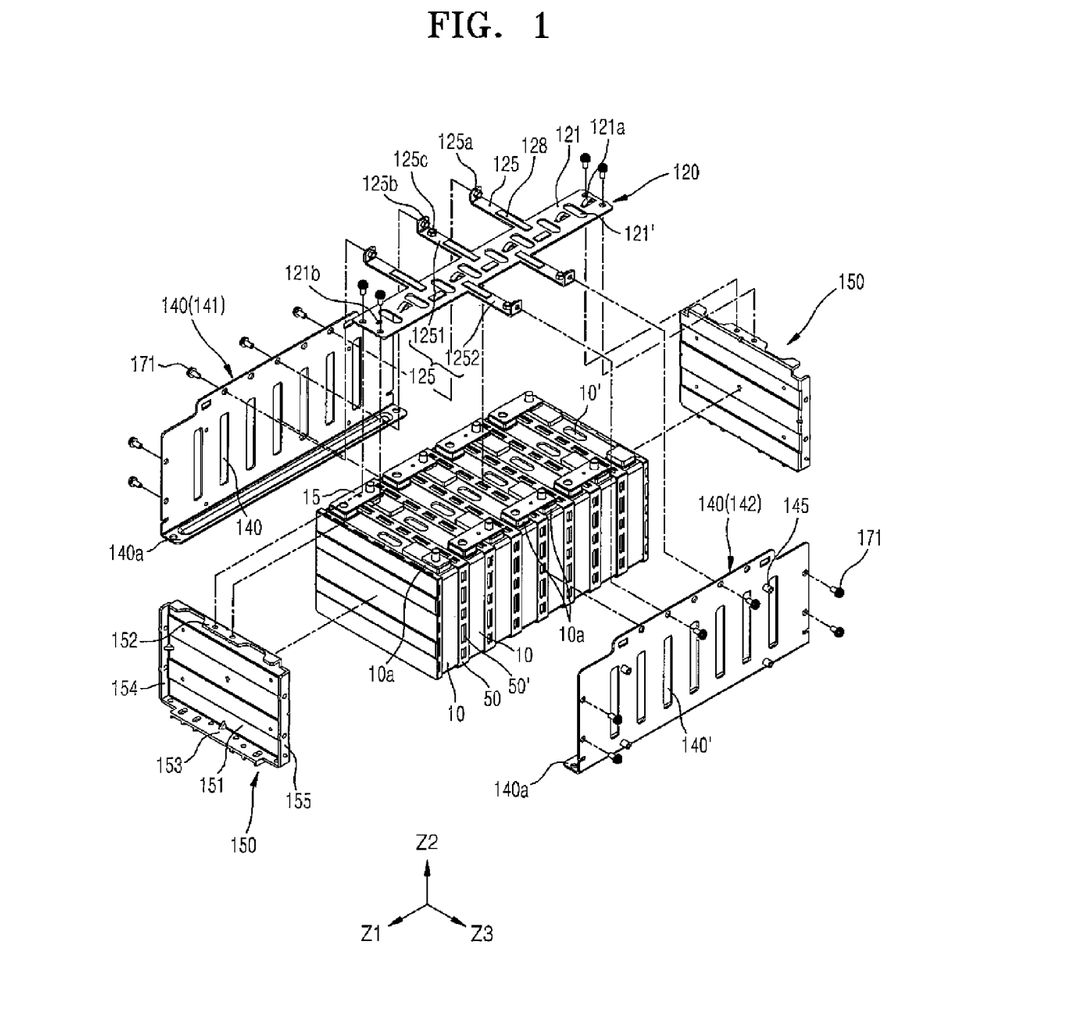
FIG. 1 is an exploded perspective view of a battery pack according to an embodiment of the present invention.

FIG. 1 is an exploded perspective view of a battery pack according to an embodiment of the present invention. Referring to FIG. 1, the battery pack includes a plurality of battery cells 10 that are arranged in an array along one direction (i.e., a Z1-axis direction), and plates 120, 140, and 150 that surround the array of the battery cells 10.

Figure 2:
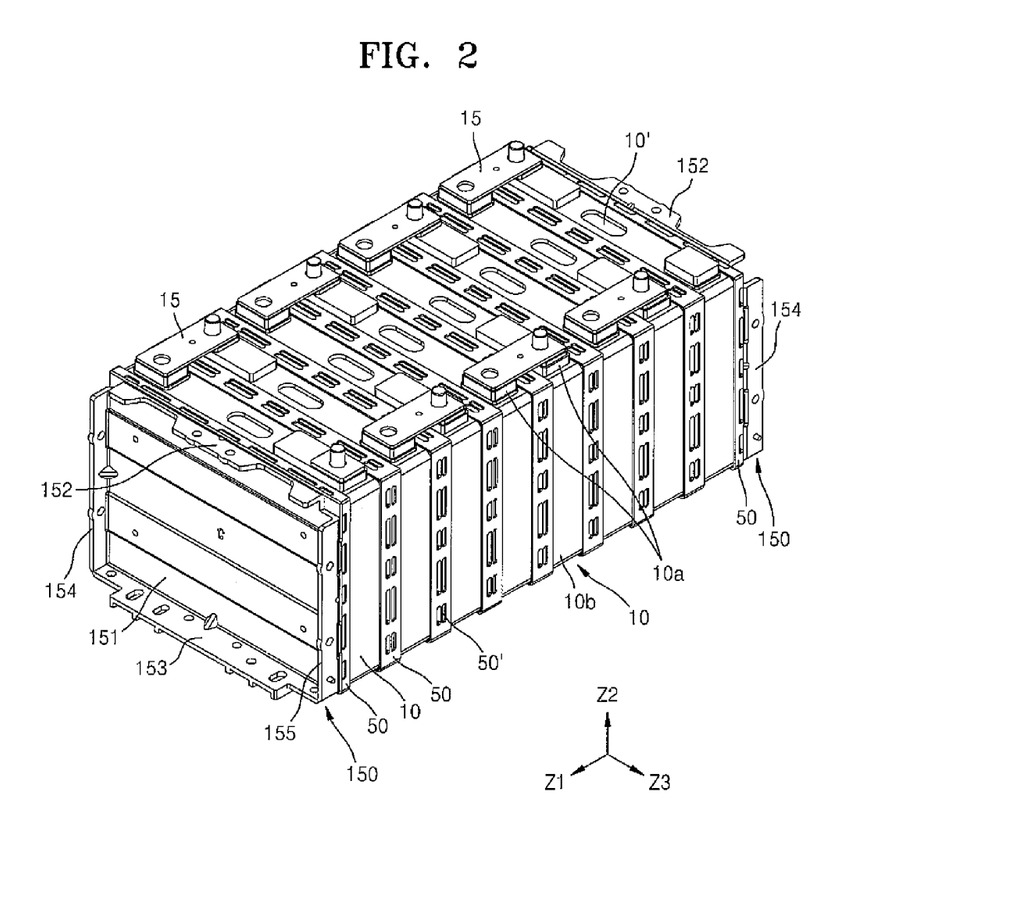
FIG. 2 is a perspective view illustrating an array of battery cells of the battery pack shown in FIG. 1 in an assembled state.

FIG. 2 is a perspective view illustrating the array of the battery cells 10 shown in FIG. 1 in an assembled state. Referring to FIG. 2, the battery cell 10 may be a secondary battery, for example, a lithium-ion battery, and may be any one of various types of secondary batteries, such as cylindrical secondary batteries, prismatic secondary batteries, or polymer secondary batteries.

For example, each of the battery cells 10 may include a case 10b, an electrode assembly accommodated in the case 10b, and an electrode terminal 10a connected electrically to the electrode assembly and extending outside of the case 10b. For example, the electrode terminal 10a may form a top of the battery cell 10, and may be exposed on an outside of the case 10b. The electrode assembly may include a positive electrode, a separator, and a negative electrode, and may be formed in a winding type or a stack type assembly. In these embodiments, the case 10b accommodates the electrode assembly therein, and the electrode terminal 10a extends outside the case 10b, such that an electrical connection between the electrode assembly and an external circuit can be formed.

In an embodiment, adjacent battery cells 10 may be electrically connected to each other through an electrical connection between adjacent electrode terminals 10a. The adjacent battery cells 10 may be connected in series or in parallel. The adjacent electrode terminals 10a in these embodiments may be connected to each other through a bus bar 15.

At least one safety vent 10' may be formed at the case 10b. The safety vent 10' in this embodiment is designed with relatively low strength such that when at least a predetermined critical point of internal pressure is applied inside the case 10b, the safety vent 10' breaks open to discharge any internal gases.

A spacer 50 formed of an insulating material may be interposed between adjacent battery cells 10. In these embodiments, the spacer 50 electrically connects the adjacent battery cells 10. For example, in an embodiment, the case 10b may have an electrical polarity, and the spacer 50 may be interposed between the adjacent battery cells 10 to block an electrical interference between the adjacent battery cells 10.

The spacer 50 may provide a heat dissipation path between the battery cells 10. In these embodiments, a heat dissipation hole 50' may be formed through the spacer 50. As described below, a side plate 140 assembled to cover a side of the spacer 50 may also include a heat dissipation hole 140' formed through the side plate 140. The heat dissipation hole 140' of the side plate 140 and the heat dissipation hole 50' of the spacer 50 may be formed at opposite positions, connected to each other to provide a heat dissipation path between the battery cells 10.

In an embodiment, the spacer 50 may be interposed between the battery cells 10 to suppress thermal expansion (i.e., swelling) of the battery cell 10. The case 10b of the battery cell 10 in this embodiment may be formed of a deformable material, for example metal. In this embodiment, the spacer 50 may be formed of a less-deformable material, such as a polymer material, to suppress swelling of the battery cell 10.

The spacer 50 may be located between adjacent battery cells 10, and the spacer 50 may also be located contacting an outside of an outermost battery cell 10 in an arrangement direction (i.e., a Z1-axis direction) of the battery cells 10. As illustrated in FIG. 2, an end plate 150 may be located on either side of the array of battery cells 10 in the arrangement direction (the Z1-axis direction), and a spacer 50 may be located between the end plate 150 and the adjacent battery cell 10, providing electrical insulation between the end plate 150 and the battery cell 10.

A pair of end plates 150 may be located on both sides of the array of battery cells 10 in the arrangement direction (the Z1-axis direction). In this embodiment, one surface of the end plate 150 is located facing an outside of the battery cell 10. In an embodiment, one surface of the end plate 150 may be assembled such that the end plate 150 contacts the spacer 50 outside the battery cell 10.

The end plates 150 in these embodiments are configured to connect and pack a group of battery cells 10 into one unit. The end plates 150 in these embodiments suppress the thermal expansion of the battery cells 10, which may be caused by a recharge/discharge operation, while retaining resistance characteristics, thereby preventing degradation in the electrical characteristics of the battery cells 10.

The end plate 150 may include a base plate 151, and flange portions 152, 153, 154, and 155, respectively, that are bent from an edge of the base plate 151 in a direction opposite to the battery cell 10 at a bending portion B. The base plate 151 may have a sufficient surface area to cover or extend over the exterior of the battery cell 10.

The flange portions 152, 153, 154, and 155 are bent from the edge of the base plate 151 in the direction opposite to the battery cell 10. The flange portions 152, 153, 154, and 155 may include a pair of side flange portions 154 and 155, respectively, on each side of the base plate 151, and bottom and top flange portions 153 and 152, respectively, formed on the top and bottom of the base plate 151.

As illustrated in FIG. 1, the flange portions 152, 153, 154, and 155 may provide a connection location for connecting the end plate 150 to an adjacent component. For example, the flange portions 152, 153, 154, and 155 may bridge a connection of the end plate 150 to the side plate 140 and the top plate 120 that are assembled to contact each other along their edges. The flange portions 152, 153, 154, and 155 may also be configured to reinforce the mechanical rigidity of the end plate 150.

The side flange portions 154 and 155 may provide a connection location for connecting the end plate 150 and the side plate 140, with an end of the side plate 140 being located on the side flange portions 154 and 155 and connected to the side flange portions 154 and 155 through screw-fastening. In this embodiment, a plurality of coupling holes may be formed at the side flange portions 154 and 155.

Figure 3:
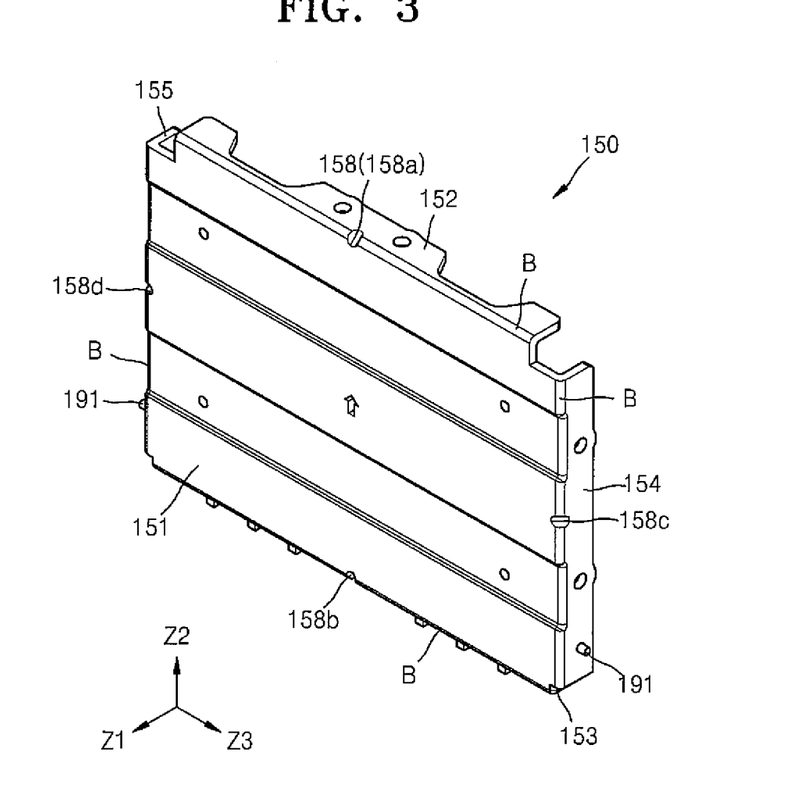
FIGS. 3 and 4 are perspective views that illustrate an end plate of a battery pack shown in two different directions.
Figure 4:
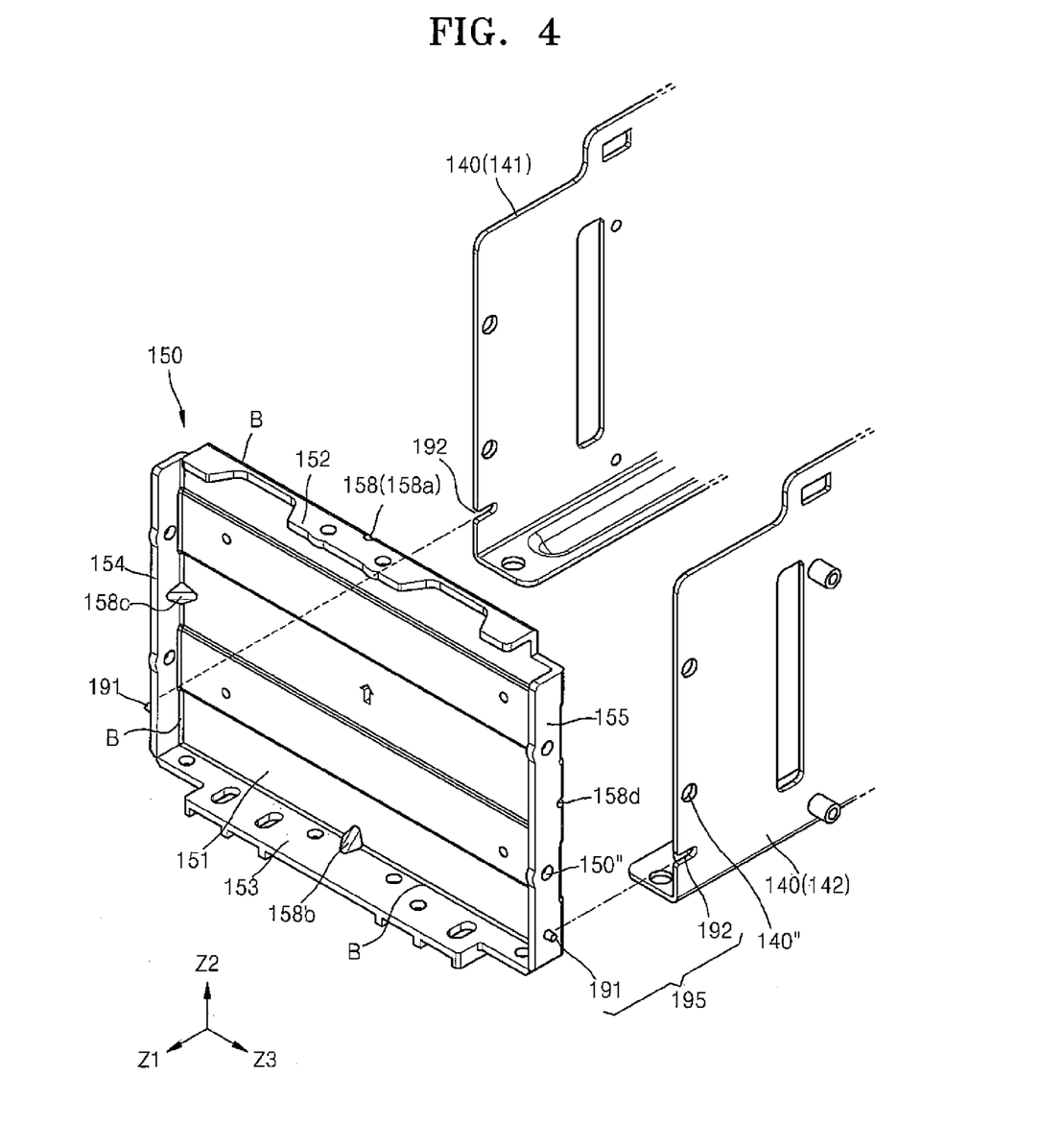

FIGS. 3 and 4 are perspective views that illustrate the end plate 150 in different directions.

Referring to FIGS. 3 and 4, the end plate 150 may further include a reinforcing bead unit 158. The reinforcing bead unit 158 may be formed at each of the bending portions B where the base plate 151 meets the flange portion portions 152, 153, 154, and 155 (i.e., the top flange portion 152, the bottom flange portion 153, and first and second side flange portions 154 and 155). The bending portions B may form corner portions where the base plate 151 contacts the flange portions 152, 153, 154, and 155. The reinforcing bead unit 158 may be imprinted by applying a predetermined pressure to each of the bending portions B of the end plate 150 by using a molding unit such as a punching unit, a pressing unit, a pressing roller, etc. As illustrated in FIG. 3, a shape of the reinforcing bead unit 158 may be engraved on one surface of each of the bending portions B, but as illustrated in FIG. 4, the shape of the reinforcing bead unit 158 may be embossed on the other surface of each of the bending portions B. For example, in an embodiment, the reinforcing bead unit 158 may have an engraved shape at an inner surface of the end plate 150 having a relatively large angle, and may have an embossed shape at an outer surface of the end plate 150 having a relatively small angle. In this embodiment, the inner surface of the end plate 150 may include a surface of the end plate 150 that faces the array of the battery cells 10, and the outer surface of the end plate 150 may include a surface of the end plate 150 that is opposite to the array of the battery cells 10.

The reinforcing bead unit 158 may be formed at more than one location so as to reinforce the strength of the end plate 150. For example, the reinforcing bead unit 158 may be formed at each of four edge portions of a rectangular shaped base plate 151, i.e., the reinforcing bead unit 158 may be formed at the bending portions B of the flange portions 152, 153, 154, and 155 which are each respectively bent from the edge portions of the base plate 151. In this embodiment, the reinforcing bead unit 158 may include a first reinforcing bead unit 158a at the bending portion B of the top flange portion 152, a second reinforcing bead unit 158b at the bending portion B of the bottom flange portion 153, and third and fourth reinforcing bead units 158c and 158d at the bending portions B of the first and second side flange portions 154 and 155, respectively.

The reinforcing bead unit 158 may reinforce the mechanical strength of the end plate 150 by having an imprinted shape. For example, the reinforcing bead unit 158 may reinforce the strength of the bending portions B that structurally connect the base plate 151 and the flange portions 152, 153, 154, and 155, and may block relative bending or twisting deformations which occurs between the base plate 151 and the flange portions 152, 153, 154, and 155 due to weakness of the end plate 150 at the bending portions B.

In an embodiment of the present invention, and upper battery pack including the array of the battery cells 10 may be stacked in a vertical direction (i.e., a Z2-axis direction) with another, lower, battery pack, and the stacked battery packs may be modularized. In an embodiment, the upper and lower battery packs that are stacked in the vertical direction (the Z2-axis direction) may be structurally modularized in a manner in which the top flange portion 152 of one of the battery packs contacts the bottom flange portion 153 of the second battery pack mechanically connecting the battery packs. In this embodiment, the lower battery pack supports the weight of the upper battery pack, and, thus, the lower battery pack has to bear a considerable load. For example, the lower battery pack supports a considerable portion of the weight of the upper battery pack via the end plate 150 of the lower battery pack, such that if the top flange portion 152 of the lower battery pack deforms, for example by bending or twisting, the upper battery pack that is supported by the top flange portion 152 of the lower battery pack becomes unstable.

In these embodiments, the reinforcing bead unit 158 reinforces the mechanical strength of the bending portions B that structurally connect the base plate 151 and the flange portions 152, 153, 154, and 155, such that the flange portions 152, 153, 154, and 155 may be prevented from bending or twisting deformation, stabilizing the support provided by a battery structure in which two or more battery packs are modularized.

The reinforcing bead unit 158 may contribute to the stability of the battery pack. For example, the reinforcing bead unit 158 may suppress volume expansion (swelling) of each battery cell 10 which occurs due to recharging and discharging operations, and may prevent characteristic electrical problems caused by deformation of each battery cell 10. For example, since the reinforcing bead unit 158 reinforces the strength of the bending portions B that structurally connect the base plate 151 and the flange portions 152, 153, 154, and 155, the base plate 151 often being a forcibly flat shape, and since a pressing force of the base plate 151 restrains the battery cells 10 in the direction of the array of the battery cells 10, the battery cells 10 may be prevented from expanding in this embodiment.

As illustrated in FIG. 4, an assembly guide 195 may be formed at a side of the end plate 150. In this embodiment, the assembly guide 195 may include an assembly pin 191 that projects from the first and second side flange portions 154 and 155 of the end plate 150. The assembly pin 191 may guide an assembly between the end plate 150 and the side plate 140. In this embodiment, the end plate 150 may slide along an inner surface of the side plate 140 and may overlap with an end portion of the side plate 140. At the overlapping portion of the end plate 150 and the side plate 140, coupling holes 150" and 140", formed in the first and second side flange portions 154 and 155 of the end plate 150, and the end portion of the side plate 140 that overlaps with the end plate 150, respectively, are aligned to match each other. Then, coupling members are inserted into the aligned coupling holes 140" and 150". In this embodiment, the assembly pin 191 guides an assembly position between the end plate 150 and the side plate 140, and according to the guidance of the assembly pin 191, the end plate 150 and the side plate 140 may be assembled at a position in which the coupling holes 140" and 150" may be aligned with respect to each other.

Figure 5:
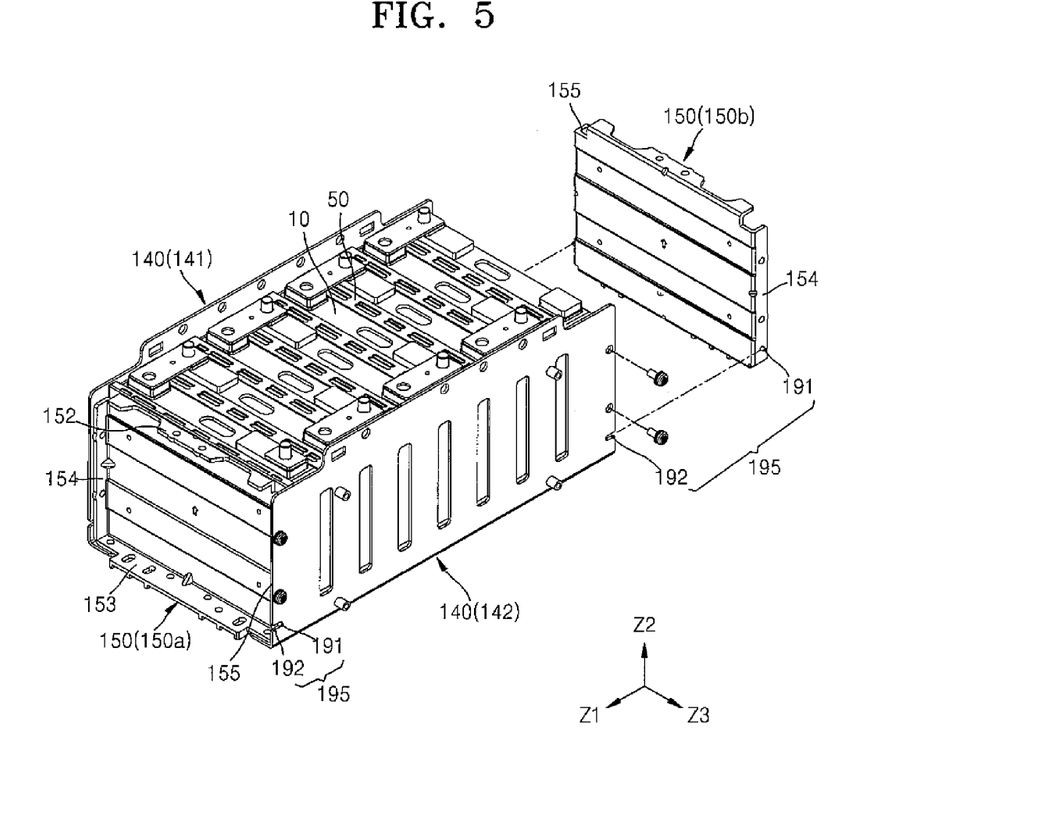
FIGS. 5, 6A, and 6B illustrate assembly processes of the battery pack of FIG. 1.
Figure 6A:
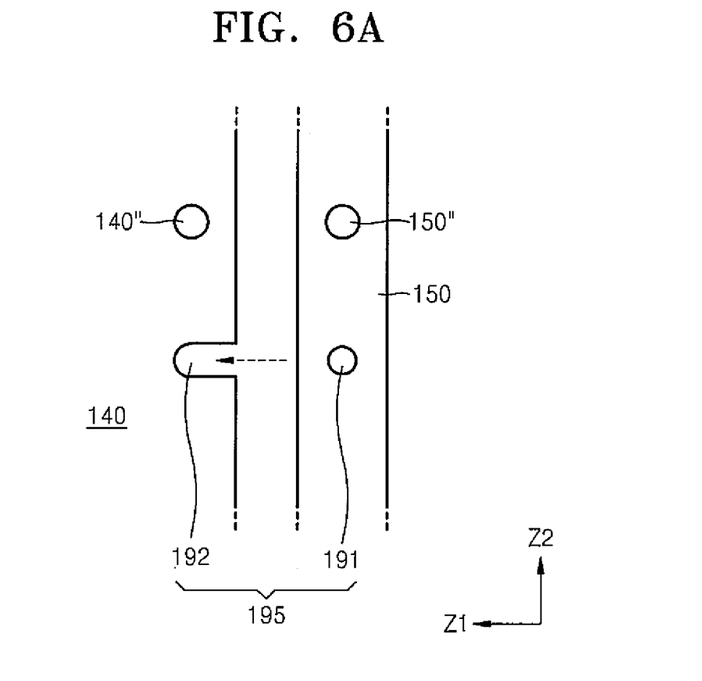
Figure 6B:
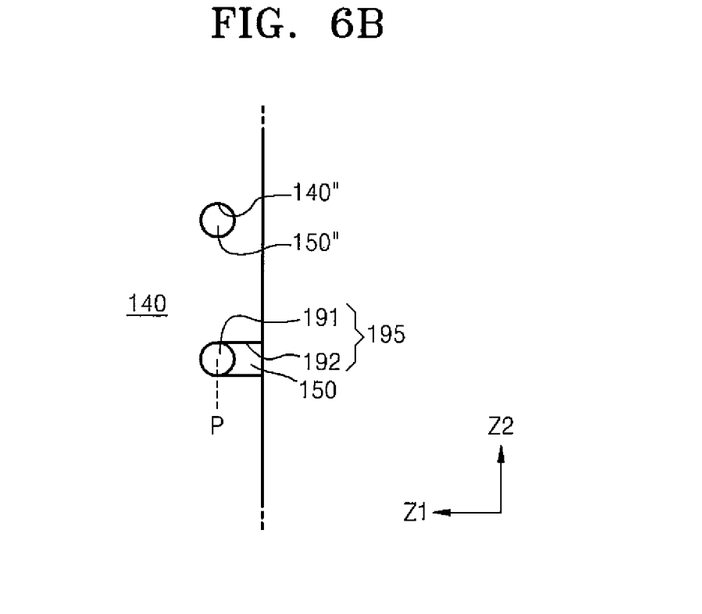

FIGS. 5, 6A, and 6B illustrate assembly processes of the battery pack. Referring to FIG. 5, a first end plate 150a from among a pair of first and second end plates 150a and 150b, respectively, that are located at both end portions of the battery cells 10 along the array of the battery cells 10 (in the Z1-axis direction) may be first combined with the side plates 140 at both sides of the first end plate 150a. For example, in an embodiment, the first and second side flange portions 154 and 155 of the first end plate 150a and end portions of the side plates 140 are arrayed to overlap with each other, coupling holes 150" and 140" formed therein are aligned with respect to each other, and then coupling members are inserted into the coupling holes 150" and 140" so as to combine the first and second side flange portions 154 and 155 of the first end plate 150a and the end portions of the side plates 140. The battery cells 10 may be sequentially stacked in an inner space defined by the first end plate 150a and the side plates 140 at both sides of the first end plate 150a. For example, the battery cells 10 and the spacers 50 that are interposed between the battery cells 10 may be sequentially stacked from the first end plate 150a. When the battery cells 10 are all arranged in an array in the inner space defined by the first end plate 150a and the side plates 140, the second end plate 150b is combined with the other end portions of the side plates 140, so that an outline of the battery pack is completed. Here, an assembly position of the second end plate 150b that is combined with the other end portions of the side plates 140 is set by the assembly guide 195. The assembly guide 195 may include the assembly pin 191 that projects from the first and second side flange portions 154 and 155 of the second end plate 150b, and an assembly rail 192 formed at the side plate 140.

With continued reference to the embodiment shown in FIGS. 6A and 6B, the assembly pin 191 that projects from the end plate 150 is inserted into the assembly rail 192 of the side plate 140, such that the assembly pin 191 and the assembly rail 192 are aligned with respect to each other, and the end plate 150 may be pressed to slide toward the array of the battery cells 10 in the Z1-axis direction. The end plate 150 may be pressed to slide toward the array of the battery cells 10 in the Z1-axis direction by a pressing unit such as a presser, for example. In this embodiment, the end plate 150 slides along the inner surface of the side plate 140 until the end plate 150 overlaps with the end portion of the side plate 140. Afterward, when the coupling holes 150" and 140" of the end plate 150 and the side plate 140, respectively, are aligned with respect to each other, the coupling members are inserted into the aligned coupling holes 140" and 150", completing an outline of the battery pack.

According to the method of this embodiment, the assembly pin 191 that projects from the end plate 150 is guided along the assembly rail 192 formed in the side plate 140, such that when the end plate 150 slides along the array of the battery cells 10 (in the Z1-axis direction), the position between the end plate 150 and the side plate 140 is not affected, and the end plate 150 that is aligned with respect to the side plate 140 can move to a coupling position P of the side plate 140.

The assembly pin 191 of the end plate 150 is inserted into the assembly rail 192 of the side plate 140, such that the end plate 150 and the side plate 140 are aligned with respect to each other. As described below, the assembly rail 192 is formed in the side plate 140 defining an opening. The assembly pin 191 of the end plate 150 is inserted into the assembly rail 192 via the opening.

In these embodiments, the end of the assembly rail 192 is open, such that the assembly rail 192 is not completely surrounded by an inner wall of the side plate 140, and that the assembly rail 192 may be connected to an exterior of the side plate 140 via the opening, allowing the assembly pin 191 to be inserted into the assembly rail 192. The opening of the assembly rail 192 is formed to complement an assembly process between the end plate 150 and the side plate 140. In this embodiment, since the end plate 150 slides along the inner surface of the side plate 140 to be coupled at the coupling position P at which the end plate 150 overlaps with the end portion (i.e., the coupling hole 140") of the side plate 140, the assembly pin 191 is inserted into the assembly rail 192 via the opening and then moves while sliding along the assembly rail 192. The assembly rail 192 may extend lengthwise along the end plate 150 (i.e., in the Z1-axis direction). For example, the assembly rail 192 may extend lengthwise along the array of the battery cells 10 (i.e., in the Z1-axis direction).

Figure 7:
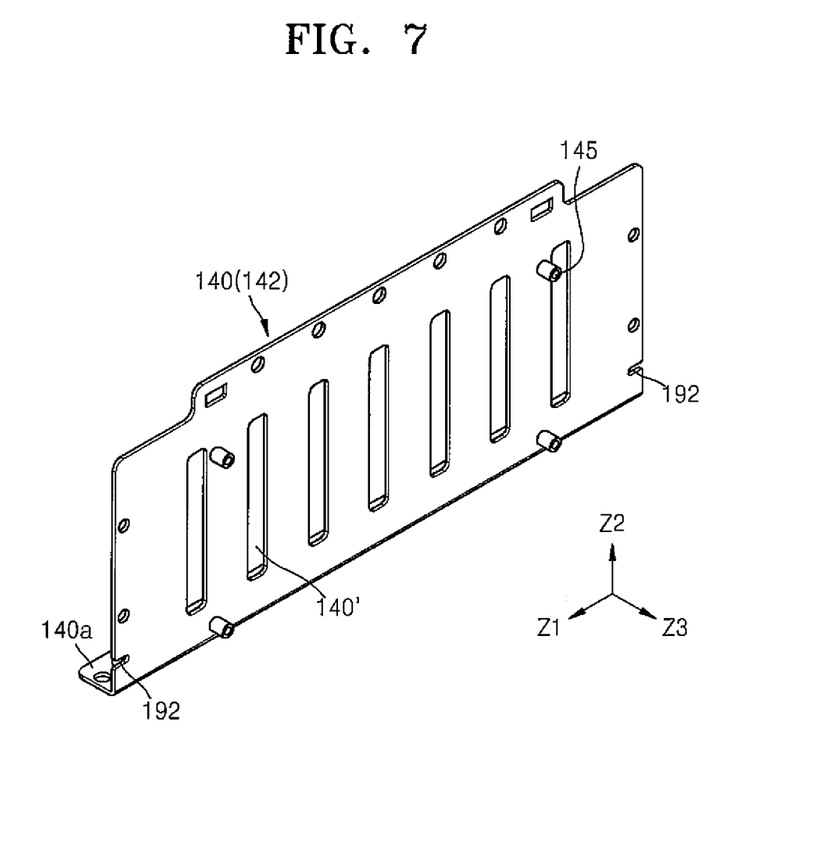
FIG. 7 illustrates a side plate of the battery pack shown in FIG. 1.

FIG. 7 illustrates the side plate 140 of the battery pack FIG. 1. Referring to FIGS. 1 and 7, the side plate 140 is located at a side of the battery cell 10. The side plate 140 covers the sides of the battery cells 10 that are arranged in a line. A pair of side plates 140 may be located one on each side of the battery cells 10 that are opposite to each other. The side plate 140 may extend in the array direction (Z1 direction) of the battery cells 10, and the ends of the side plate 140 may be connected to the end plates 150 on its opposite sides. The side plate 140 may be screw-connected to the first and second side flange portions 154 and 155 formed at a side edge of the end plate 150. After the side plate 140 and the first and second side flange portions 154 and 155 are positioned to overlap with each other, and the coupling holes 140" and 150" are aligned, the side plate 140 and the first and second side flange portions 154 and 155 may be screw-connected by a fastening member such as a bolt and nut. The screw-connection between the side plate 140 and the first and second side flange portions 154 and 155 may form a surface contact, allowing the side plate 140 and the first and second side flange portions 154 and 155 to contact each other in at least a portion thereof.

The assembly rail 192 may be formed in the side plate 140. The assembly rail 192 allows the assembly pin 191 of the end plate 150 to be inserted into the opening of the assembly rail 192, and may form the assembly guide 195 used to align the side plate 140 and the end plate 150.

For example, the assembly pin 191 of the end plate 150 is inserted into the assembly rail 192 via the opening and slides along the assembly rail 192 (i.e., along the Z1-axis direction). In this embodiment, the end plate 150 slides along the inner surface of the side plate 140 until the end plate 150 reaches a coupling position at which coupling holes 150" and 140" of the end plate 150 and the side plate 140 are aligned with respect to each other, and the end plate 150 and the side plate 140 can be coupled with each other. In this embodiment, the assembly pin 191 guides the end plate 150 to allow the end plate 150 to slide along the assembly rail 192 without deviation. As described above, the sliding movement of the end plate 150 is guided by the assembly pin 191 and the assembly rail 192, such that a separate aligning operation is not required during assembly of the end plate 150. Also, moving the end plate 150 along the sliding direction of the assembly rail 192 (the Z1-axis direction) allows the end plate 150 and the side plate 140 to align with respect to each other at the coupling position.

The assembly rail 192 may extend lengthwise along the sliding direction (i.e., the Z1-axis direction) of the end plate 150, defining the sliding direction (i.e., the Z1-axis direction) of the end plate 150. For example, the assembly rail 192 may extend lengthwise along the array of the battery cells 10. As described above with reference to FIG. 5, when the first end plate 150a from among the pair of the first and second end plates 150a and 150b that are located at both end portions of the battery cells 10 is combined with the side plates 140, the battery cells 10 are sequentially stacked in the inner space defined by the first end plate 150a and the side plates 140. Then, the second end plate 150b may be combined with the other end of the array of the battery cells 10. In this embodiment, the second end plate 150b slides along the array of the battery cells 10 (i.e., in the Z1-axis direction) until the second end plate 150b reaches the coupling position with the side plates 140, the assembly rail 192 extending lengthwise along the array of the battery cells 10 (i.e., in the Z1-axis direction) to allow the assembly pin 191 of the end plate 150 to slide along the assembly rail 192.

As illustrated in FIG. 7, the assembly rail 192 may be formed in each of the end portions (i.e., one end portion and the other end portion) of the side plate 140, such that the side plate 140 and the pair of the first and second end plates 150a and 150b that are combined with the end portion and the other end portion of the side plates 140 may be aligned with respect to each other. Since shapes of the end portion and the other end portion of the side plate 140 may be symmetrical to each other, it may not be required to select an assembly direction from among the end portion and the other end portion of the side plates 140, and workability of the assembly process may be improved. In this embodiment, since a pair of the side plates 140 is formed at each side of the end plate 150, a pair of assembly pins 191 that correspond to the side plates 140 at each side of the end plate 150 may be formed at the first and second side flange portions 154 and 155.

In these embodiments, one assembly rail 192 may be formed in each of the end portion and the other end portion of the side plate 140. Thus, in an embodiment, two assembly rails 192 may be formed, one in the end portion, and one in the other end portion of the side plate 140, respectively.

The number of the assembly rails 192 required is determined in consideration of deterioration of rigidity of the side plate 140. In an embodiment where two or more assembly rails 192 are formed in each of the end portion and the other end portion of the side plate 140, when the two or more assembly rails 192 extend lengthwise along the Z1-axis direction, the two or more assembly rails 192 may be torn along the extension direction (i.e., the Z1-axis direction). In particular, since the assembly rail 192 contacts the assembly pin 191 of the end plate 150, a defect such as a tear may result from even a minor shake due to an assembly tolerance between the end plate 150 and the side plate 140.

In embodiments where a plurality of assembly rails 192 or a plurality of assembly pins 191 are formed for position alignment between the end plate 150 and the side plate 140, assembling the plurality of assembly rails 192 or assembly pins 191 may be complicated, and, thus, the number of the assembly rails 192 may need to be limited.

The side plate 140 may have a substantially plate-like shape, and may include a locking jaw 140a that is bent to support a portion of the bottom surface of the battery cell 10. The side plates 140 on the opposite side surfaces of the battery cell 10 may support the bottom of the battery cell 10 by a pair of locking jaws 140a that are bent in opposite directions.

The locking jaw 140a may extend throughout the overall length of the side plate 140 in the arrangement direction (i.e., a Z1-axis direction) of the battery cells 10. The two ends of the locking jaw 140a may be screw-connected to the bottom flange portion 153 of the end plate 150, via coupling holes at the locking jaw 140a and the bottom flange portion 153. After the coupling holes 140" and 150" are aligned, the side plate 140 and the end plate 150 may be screw-connected by a fastening member penetrating through the locking jaw 140a and the bottom flange portion 153. The locking jaw 140a and the bottom flange portion 153 may surface-contact each other at a corner position of the battery pack. In this embodiment, the side plate 140 may be fastened to the bottom flange portion 153 and the first and second side flange portions 154 and 155 of the end plate 150, and may form an accommodation space for accommodating an array of battery cells 10.

The side plate 140 may include a heat dissipation hole 140'. For example, a plurality of heat dissipation holes 140' may be formed at predetermined intervals in the arrangement direction (i.e., the Z1-axis direction) of the battery cells 10. The heat dissipation hole 140' allows contact between the battery cell 10 and external air, thereby making it possible to rapidly discharge heat generated from the battery cell 10.

Except for a portion supported by the locking jaw 140a of the side plate 140, the bottom of the battery cell 10 may be exposed. External air may be allowed to flow between the battery cells 10 and through the bottom of the battery cell 10 exposed away from the side plate 140, and heat dissipation of the battery cell 10 may be accelerated.

The side plate 140 may include a boss member 145 for attachment of a circuit board. For example, the circuit board may form a battery management system (BMS). One surface of the side plate 140 may face the side of the battery cell 10, and a circuit board may be attached to the other surface of the side plate 140. For example, the circuit board may be configured to monitor a recharge/discharge state of the battery cell 10, and may control an overall recharge/discharge operation of the battery pack.

For example, the boss member 145 may be located at four positions in a lattice configuration, corresponding to a substantially rectangular or rectangular circuit board, and may be located at a multiple of four positions, corresponding to a plurality of circuit boards. A coupling hole may be formed at the circuit board, and a screw member penetrating the coupling hole may be fastened to the boss member 145 on the side plate 140 to fix the circuit board to the side plate 140.

Figure 8:
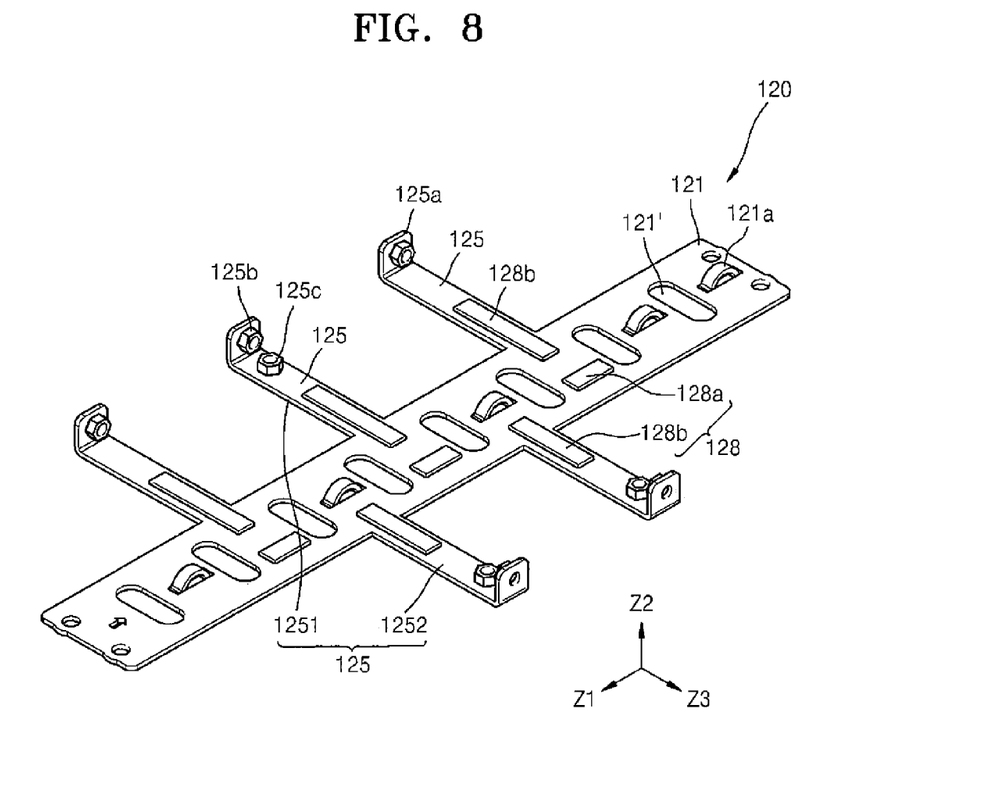
FIG. 8 is a perspective view of a top plate of the battery pack shown in FIG. 1.

FIG. 8 is a perspective view of the top plate 120 of the battery pack. Referring to FIGS. 1 and 8, the top plate 120 is located on the battery cell 10. The top plate 120 may include a base frame 121 extending across a top center of the battery cell 10 in the arrangement direction (i.e., a Z1-axis direction) of the battery cells 10, and a support frame 125 extending from the base frame 121 to the side plate 140.

At least one opening 121' may be formed at a position corresponding to the safety vent 10' of the battery cell 10 in the longitudinal direction (i.e., the Z1-axis direction) of the base frame 121. The two ends of the base frame 121 may be fastened to the end plates 150 on the opposite sides of the battery cell 10. The base frame 121 may be screw-connected to the top flange portion 152 at the top edge of the end plate 150, after the base frame 121 and the top flange portion 152 are oriented to overlap each other with the coupling holes aligned. The base frame 121 and the top flange portion 152 may be screw-connected by a fastening member such as a bolt and nut, forming a surface contact where the base frame 121 and the top flange portion 152 contact each other in at least a portion thereof.

The base frame 121 in this embodiment supports the end plates 150 at both ends in the arrangement direction (i.e., the Z1-axis direction) of the battery cells 10, and maintains a predetermined space between the end plates 150, thereby making it possible to suppress the expansion of the battery cell 10 in the arrangement direction (i.e., the Z1-axis direction) and prevent the degradation of recharge/discharge characteristics caused by deformation of the battery cell 10.

The support frame 125 in these embodiments is connected to the side plate 140 across the top of the battery cell 10 in a direction intersecting the base frame 121, for example, a Z3-axis direction of the base frame 121. The support frame 125 may be integral with the base frame 121.

In this embodiment, the support frame 125 includes one end extending from the base frame 121, and the other end extending from the one end and fastened to the side plate 140. For example, one end of the support frame 125 may extend from the base frame 121 in an integral manner, and the other end of the support frame 125 may be screw-fastened to the side plate 140. In this embodiment, the other end of the support frame 125 may include a bent portion 125a that is bent to face the side plate 140 and is located on the side plate 140.

The side plate 140 and the bent portion 125a may be connected overlapping each other, and a connection fastening member 125b may be formed at the bent portion 125a. For example, after the connection fastening member 125b and the coupling hole of the side plate 140 are aligned, a through fastening member 171 penetrating the side plate 140 may be connected to the connection fastening member 125b to fasten the side plate 140 and the support frame 125.

For example, the through fastening member 171 and the connection fastening member 125b may include a bolt and a nut, respectively. The through fastening member 171 may penetrate the side plate 140 and the support frame 125, which overlap each other, and may be connected to the connection fastening member 125b fixed to the support frame 125. The bent portion 125a of the support frame 125 may be connected to the side plate 140 by, for example, welding, instead of by screw-connection.

The support frame 125 in these embodiments supports the side plates 140 located at both sides of the battery cells 10, and maintains a predetermined space between the side plates 140, thereby making it possible to suppress the expansion of the battery cell 10 in the lateral direction and prevent the degradation of recharge/discharge characteristics caused by deformation of the battery cell 10.

For example, the battery cell 10 may be assembled by being pressed in the arrangement direction (i.e., the Z1-axis direction) by the base frame 121 or the end plate 150. The battery cell 10 may be expanded by the pressing pressure, and, thus, the side plate 140 may be deformed or bent convexly.

The base frame 121 combines the side plates 140, which are located at both sides of the battery cell 10, with each other at several positions to press the battery cell 10 in the lateral direction, thereby making it possible to prevent the side plate 140 from being bent convexly by the expansion of the battery cell 10. Deformation of the battery cell 10 degrades recharge/discharge characteristics of the battery cell 10. Therefore, in these embodiments, the recharge/discharge characteristics of the battery cell 10 may be maintained by preventing the deformation of the battery cell 10.

The support frame 125 may provide mechanical rigidity for resisting shaft torsion and angular momentum with respect to a center of rotation in the arrangement direction (i.e., the Z1-axis direction) of the battery cells 10. That is, the support frame 125 may support a predetermined space between a pair of side plates 140, thereby providing sufficient rigidity for resisting the shaft torsion and shaft rotation of the battery pack.

The support frame 125 may include a first support frame 1251 extending from one side of the base frame 121 toward a first side plate 141, and a second support frame 1252 extending from the other side of the base frame 121 toward a second side plate 142. The first and second support frames 1251 and 1252 may extend from opposite sides of the base frame 121, and may be formed at alternate positions in the longitudinal direction (i.e., the Z1-axis direction) of the base frame 121.

At least one adding unit 128 may be formed at the top plate 120. The adding unit 128 may be attached to the base frame 121 and the support frame 125, and may serve to supplement the mechanical rigidity of the top plate 120.

In these embodiments, the top plate 120 supports a predetermined space between the pair of side plates 140, thereby suppressing the expansion of the battery cell 10 and providing mechanical rigidity for resisting shaft torsion and shaft rotation with respect to a center of rotation in the arrangement direction (i.e., the Z1-axis direction) of the battery cells 10. The adding unit 128 may supplement the rigidity of the top plate 120 to provide sufficient rigidity for resisting the expansion (swelling) of the battery cell 10 or the shaft torsion and shaft rotation of the battery pack.

For example, the adding unit 128 may include a first adding unit 128a on the base frame 121, and a second adding unit 128b across the boundary between the base frame 121 and the support frame 125. A plurality of first adding units 128a may be arranged along the base frame 121, between the openings 121'. The first adding unit 128a may extend along the base frame 121 to provide structural rigidity in the longitudinal direction of the base frame 121 (the Z1-axis direction).

The second adding unit 128b may extend from the base frame 121 to the support frame 125. The second adding unit 128b may extend in the longitudinal direction of the support frame 125 to provide structural rigidity in the longitudinal direction of the support frame 125 (i.e., the Z3-direction).

For example, the first and second adding units 128a and 128b may extend in the longitudinal direction of the base frame 121 (i.e., the Z1-direction) and the longitudinal direction of the support frame 125 (i.e., the Z3-direction), respectively, to provide the rigidity in the respective longitudinal directions, thereby maintaining a predetermined space between the pair of end plates 150 and between the pair of side plates 140, and suppressing the expansion or torsion deformation of the battery cell 10.

Figure 9:
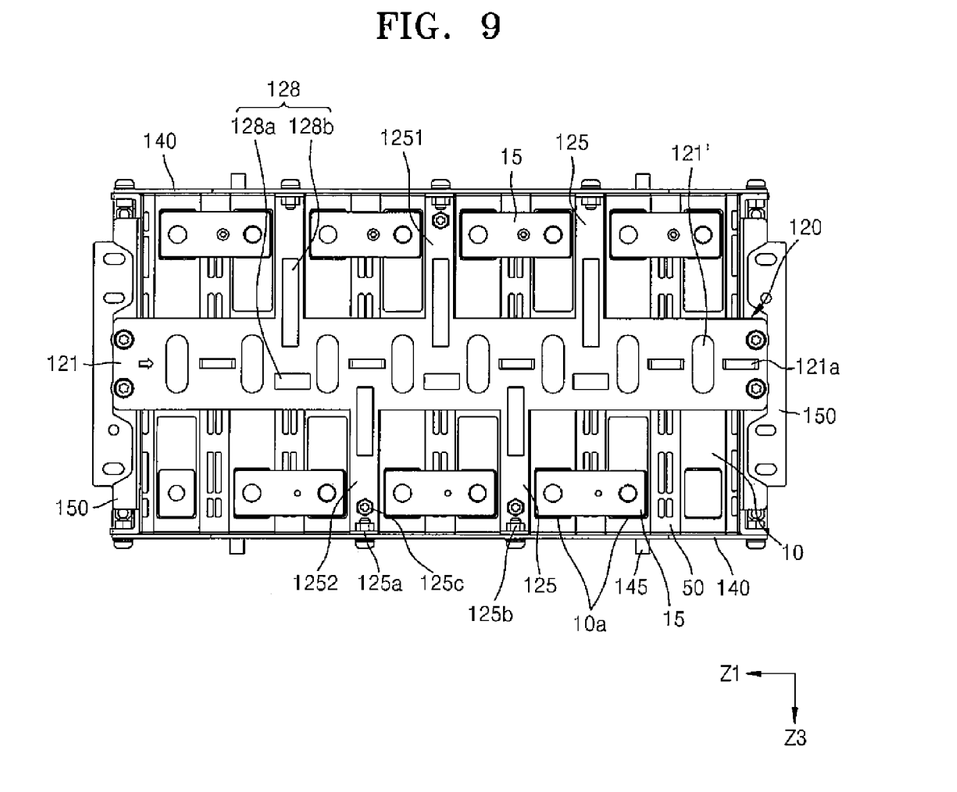
FIG. 9 is top view of the battery pack shown in FIG. 1.

FIG. 9 is top view of the battery pack. Referring to FIG. 9, a group of battery cells 10 forming the battery pack may be electrically connected by bus bars 15, and may be connected in series, for example. The bus bars 15 electrically connect different pairs of battery cells 10. The bus bar 15 may be inserted into a protrusion portion of the electrode terminal 10a, or may be connected to the electrode terminal 10a by welding. In this embodiment, a plurality of bus bars 15 may be assembled at alternate positions on the left and right sides (i.e., ±Z3 directions) to connect the group of battery cells 10 sequentially in the arrangement direction (i.e., the Z1-axis direction) of the battery cells 10.

The top plate 120 may be located on the battery cell 10, together with the bus bar 15. In this embodiment, the bus bar 15 and the top plate 120 may be located at different positions to prevent a mechanical/electrical interference therebetween.

In these embodiments, the bus bar 15 extends in one direction (i.e., the Z1-axis direction) to connect a pair of adjacent battery cells 10, and a plurality of bus bars 15 connect different pairs of battery cells 10. The top plate 120 and the support frame 125 are located in a space between the bus bars 15, thereby avoiding an interference with the bus bars 15. For example, the support frame 125 may include first and second support frames 1251 and 1252 that extend in opposite directions from the base frame 121. The first and second support frames 1251 and 1252 may be formed at alternate positions in the longitudinal direction (i.e., the Z1-axis direction) of the base frame 121, and the maximum allowable number of support frames 125 may be determined according to the arrangement of the bus bars 15.

The top plate 120 may guide wires extracted from the bus bars 15 or the electrode terminals 10a of the respective battery cells 10. For example, the wires may include a plurality of wires that are extracted from the bus bars 15 or the electrode terminals 10a distributed at a plurality of positions. The plurality of wires may externally extend to transmit information of the battery cell 10, such as voltage measurement information or temperature measurement information.

For example, one end of each of the wires may be connected to the electrode terminal 10a or the bus bar 15, and the other end thereof may be connected to a battery management system (BMS). In this embodiment, the plurality of wires may be combined through at least one wire guide 121a, formed at the top plate 120, creating an extended path of the wires.

The wire guide 121a may be coupled with the top plate 120, for example, on the base frame 121, and may be, for example, a ring-shaped piece on the base frame 121.

According to the one or more embodiments of the present invention, a reinforcing structure is arranged at the end plate 150 for structurally connecting the battery cells 10, so that the mechanical strength of the end plate 150 may be reinforced, and accordingly, deformation of the battery pack may be efficiently suppressed. Therefore, the restraint of the end plate 150 whose deformation is prevented may suppress volume expansion, such as swelling of the battery cells 10, which occurs due to the recharging and discharging operations of the battery cells 10, such that deterioration of the electrical output function of the battery cells 10 may be prevented.

According to the one or more embodiments of the present invention, the assembly guide 195 aligns the coupling position between the end plate 150 and the side plate 140 that house the battery cells 10 and are assembled with respect to each other, streamlining the coupling operation with respect to the end plate 150 and the side plate 140.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A battery pack comprising:
    a pair of end plates facing each other;
    a plurality of battery cells arrayed between the end plates; and
    a pair of side plates each extending along a length of the plurality of battery cells, and coupled to the end plates, wherein each of the end plates comprises:
    a base plate;
    bending portions bent from each edge of the base plate in a direction away from the plurality of battery cells, each bending portion comprising a reinforcing bead wherein the reinforcing bead unit is engraved to be recessed from a first surface of each bending portion, and is embossed to protrude from a second opposing surface of each bending portion; and
    a flange portion connected to the base plate at each bending portion.

2. The battery pack of claim 1, wherein the reinforcing bead unit is imprinted.

3. The battery pack of claim 1, wherein the reinforcing bead unit is engraved when the reinforcing bead unit is on an inner surface of the bending portions facing the plurality of battery cells, and the reinforcing bead unit is embossed when the reinforcing bead unit is on an outer surface of the bending portions facing away from the plurality of battery cells.

4. The battery pack of claim 1, wherein the flange portion comprises:
    a top flange portion at an upper end of the base plate;
    a bottom flange portion at a lower end of the base plate; and
    a first side flange portion and a second side flange portion at each respective side surface of the base plate.

5. The battery pack of claim 4, wherein the reinforcing bead unit comprises:
    a first reinforcing bead unit on the bending portion connected to the top flange portion;
    a second reinforcing bead unit on the bending portion connected to the bottom flange portion; and
    a third reinforcing bead unit and a fourth reinforcing bead unit on the bending portions connected to the first side flange portion and the second side flange portion, respectively.

6. The battery pack of claim 1, wherein the pair of side plates is coupled to the end plates with an assembly guide configured to align the end plates with the pair of side plates.

7. The battery pack of claim 6, wherein the assembly guide comprises:
    an assembly pin on each of the end plates; and
    an assembly rail in each of the side plates, the assembly rail being configured to receive the assembly pin and to guide a sliding movement of the assembly pin.

8. The battery pack of claim 7, wherein the flange portion comprises a first side flange portion and a second side flange portion, respectively, on each side surface of the base plate, and
    wherein each of the first side flange portion and the second side flange portion comprise an assembly pin.

9. The battery pack of claim 8, wherein each of the first side flange portion and the second side flange portion are coupled to respective end portions of the side plates.

10. The battery pack of claim 9, wherein the first side flange portion and the second side flange portion comprise coupling holes, and the side plates comprise corresponding coupling holes such that when the first and second side flange portions are coupled to respective side plates, they overlap with the end portions of the side plates, and the coupling holes align at coupling positions, the coupling holes being configured to receive coupling members inserted into the coupling holes.

11. The battery pack of claim 10, wherein the assembly pins of the first side flange portion and the second side flange portion are configured to be inserted from an exterior of the respective side plates into the assembly rails, and configured to then slide to the coupling positions along the assembly rails.

12. The battery pack of claim 7, wherein the assembly rail comprises an opening extending lengthwise along a sliding movement direction of the assembly pin.

13. The battery pack of claim 12, wherein the assembly rail extends lengthwise along an array of the plurality of battery cells.

14. The battery pack of claim 12, wherein the opening of the assembly rail is coupled to an exterior of each side plate.

15. The battery pack of claim 7, wherein the assembly rail is at both end portions of each of the side plates.

16. The battery pack of claim 15, wherein one assembly rail is at each of the end portions of each of the side plates.

17. The battery pack of claim 16, wherein each end portion of each of the side plates is coupled to a respective end plate.

* * * * *